Oct. 1, 1968

V. J. SPRADLING 3,403,935

CAMPER UNIT

Filed June 4, 1965

INVENTOR.
VERNON J. SPRADLING
BY
Jeare, Jetzer & Jeare
ATTORNEYS

Oct. 1, 1968 V. J. SPRADLING 3,403,935
CAMPER UNIT
Filed June 4, 1965 4 Sheets-Sheet 3

INVENTOR.
VERNON J. SPRADLING
BY
*Jeane, Fetzer & Keane*
ATTORNEYS

Oct. 1, 1968  V. J. SPRADLING  3,403,935
CAMPER UNIT

Filed June 4, 1965  4 Sheets-Sheet 4

INVENTOR.
VERNON J. SPRADLING
BY
*Jane, Fetzer & Jane*
ATTORNEYS 3,403,935
CAMPER UNIT
Vernon J. Spradling, 7536 King Memorial Road, Mentor, Ohio 44060
Filed June 4, 1965, Ser. No. 461,386
15 Claims. (Cl. 296—23)

ABSTRACT OF THE DISCLOSURE

A camper unit for mounting on a vehicle including a partially collapsible body, a wing member hinged to each of the side walls of the body, an interchangeable undercarriage detachably connected to the underside of the body, and an excess section hinged to the undercarriage to provide access to the trunk area of the vehicle.

---

This invention relates to camping equipment, and more particularly to an improved construction for a camper unit which can be mounted on a vehicle for camping, boating and/or traveling.

In the past few years, there has been an appreciable advance in the number of persons seeking the outdoors for purpose of travel and/or camping, particularly those with large families. With such advance there has been demonstrated a corresponding increase in the need for suitable camping equipment which will adequately meet the functional and economical requirements of both average and the large size families.

Heretofore, various types of camping equipment have been employed to meet these requirements, but none have been demonstrated to be entirely satisfactory. One such type has been the "pick-up" type camper which fits on a truck bed and/or over the cab of the truck. Such campers are expensive to purchase and are generally unsuitable for smaller size families. In addition, such campers require the rental of a pick-up truck or the purchase and use of the same as a second car which greatly limits its suitability for most families. Recently, another type of unit has been the camper which mounts on the roof of a sedan or stationwagon. Though relatively inexpensive, this type of camper does not provide the space requirements nor the versatility for most families. Another version of the roof-type camper has been a unit which is mounted "piggy-back" on the roof and trunk area of the vehicle. Such unit has the disadvantage of being adapted for use only with sedan type vehicles and not with other vehicles, such as stationwagons or the like. This unit has the serious disadvantage of not providing access to the trunk area of the sedan in the assembled and roading position of the camper. In addition, such heretofore known "piggy-back" units are generally suitable for use with sedans having only the "turtle-back" design trunk area, thereby again limiting its serviceability to most persons and/or families.

Accordingly, an object of the present invention is to provide an improved construction for a camper unit which is inexpensive to purchase, which is of a rugged, lightweight construction, which will sleep at least thirteen adult persons when fully erected, and which provides ample storage area.

Another object of the present invention is to provide a camper unit of the character described which may be quickly and easily mounted on and removed from a vehicle, which when mounted on the vehicle in the roading position offers little wind resistance, and which provides a streamlined, low profile construction to facilitate passage beneath limbs, bridges and other such overhanging obstructions.

Another object of the present invention is to provide a camper unit of the character described which includes a partially collapsible main body section which will sleep at least seven adult persons when erected, a collapsible rear porch section, a collapsible undercarriage tent section, and a collapsible front porch section.

A further object of the present invention is to provide a camper unit of the character described which includes a novel detachable, interchangeable undercarriage unit which automatically adapts the camper for use with practically any type of sedan and/or stationwagon, and which interchangeable undercarriage unit incoroprates a novel, pivotal access section for ingress and egress to the trunk area of the vehicle and/or to the collapsible undercarriage tent section.

Another object is to provide an access section of the character described which includes at least one removable member to provide ingress and egress to the exterior of the body section in the closed position of the excess section.

Another object of the present invention is to provide a camper unit of the character described wherein the main body section includes pivotal side wings and rear wall portions which can be automatically raised into the erected position, and which main body section includes a plurality of fluid actuated telescopic members for automatically supporting the unit in the erected position above the ground.

Another object of the present invention is to provide a camper unit of the character described wherein the rear wall of the main body section is constructed and arranged to provide an additional sleeping area and/or to provide a floor for the collapsible rear porch section.

A further object of the present invention is to provide a camper unit of the character described that is adapted to mount as an integral part a water craft of novel construction, which craft provides additional head room in the camper, which makes available the interior of the craft for additional storage area, and which may be quickly and easily removed for boating purposes.

A still further object of the present invention is to provide a camper unit of the character described which can be easily elevated and stored adjacent the roof of a single car garage in the fully collapsed position, and which can be readily moved from one area to another when removed from the vehicle.

Further objectives of the invention will appear as the description proceeds in connection with the appended claims and the annexed drawings wherein:

Figures 1, 2, 2A:
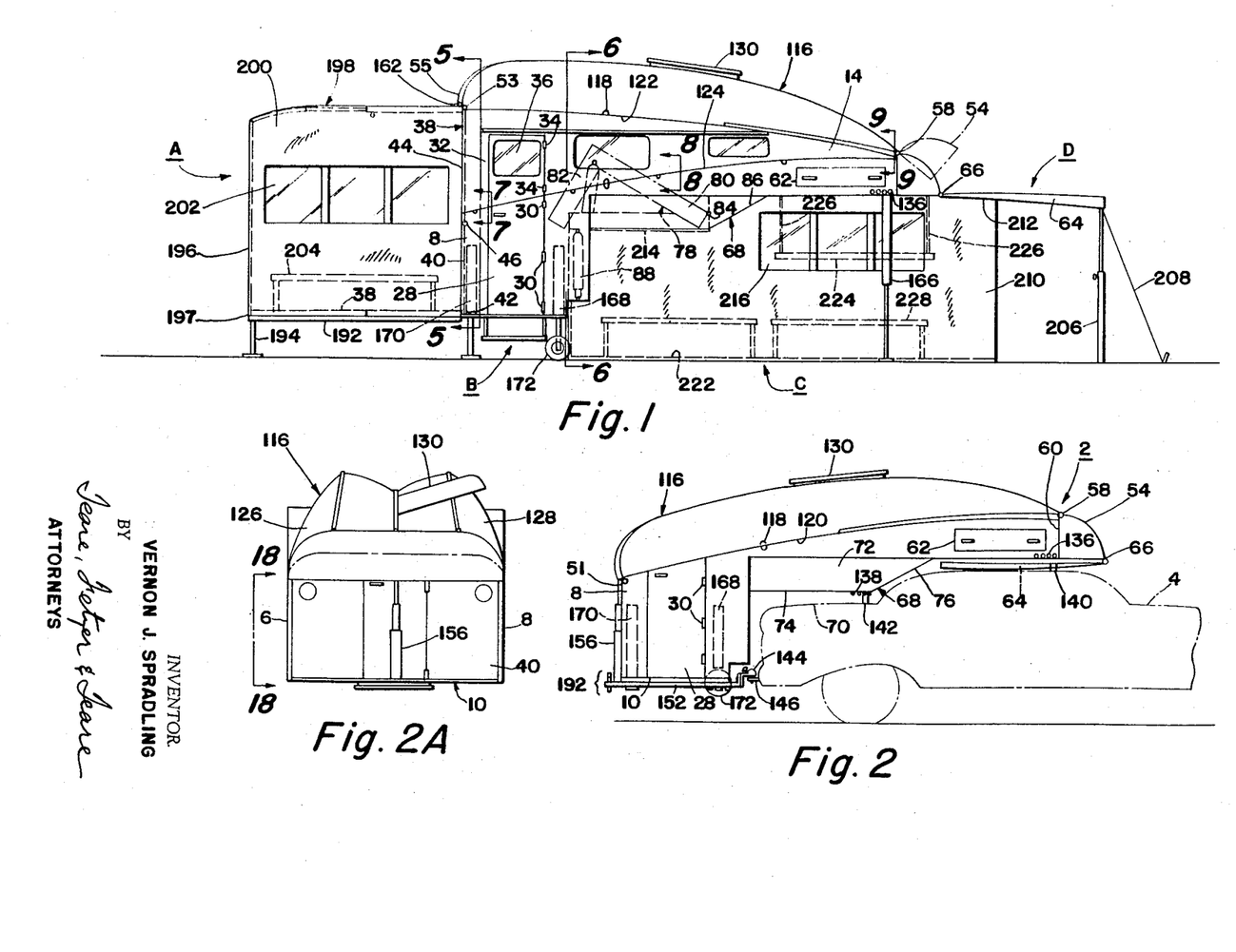
FIG. 1 is a side elevation view of the camper unit made in accordance with the present invention and showing the unit in the fully erected position for purposes of camping.
FIG. 2 is a side elevation view showing the camper unit in the fully collapsed position and mounted on a vehicle for travel.
FIG. 2A is rear end view of the unit shown in FIG. 2.

Referring now again to the drawings, and in particular to FIGS. 1–4 thereof, the camper unit in one form of the invention, designated generally at 2, is shown in the completely erected position in FIG. 1 and in the completely collapsed position in FIG. 2 for mounting on a conventional sedan type vehicle 4. As best shown in FIG. 1, the unit generally comprises a collapsible rear porch section A which may serve as a sleeping and/or living area; a partially collapsible main body section B which may serve as a combination cooking, sleeping and/or living area; a collapsible undercarriage tent section C which may serve as a "split-level" sleeping and/or living area; and a collapsible front porch section D which provides an extension of the undercarriage tent section C, and which provides additional living area in the fully erected position of the unit.

Figure 7:
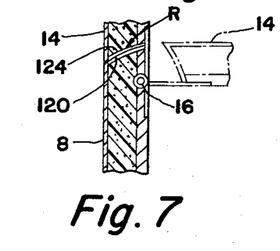
FIG. 7 is a fragmentary vertical section view taken along the plane of line 7—7 of FIG. 1.
Figures 8, 9:
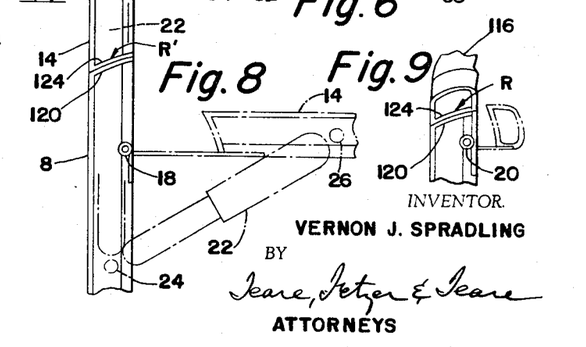
FIG. 8 is a fragmentary vertical section view taken along the plane of line 8—8 of FIG. 1.
FIG. 9 is a fragmentary vertical section view taken along the plane of line 9—9 of FIG. 1.

Generally, the partially collapsible main body section B is of a low profile, generally L-shaped construction in the fully collapsed position (FIG. 2) which comprises a pair of rigid, vertically upstanding side walls 6 and 8 mounted on a floor 10. A pair of generally triangular shaped wings 12 and 14 are pivotally connected to the respective side walls 6 and 8 by means of "drop-type" hinges 16, 18 and 20 disposed on the interior thereof, as best shown in FIGS. 7-9. The wings 12 and 14 are adapted to be automatically raised into the vertical erected position (FIG. 1) from the horizontal collapsed position (FIG. 2) by means of spring-loaded tubes 22 (FIG. 8) which are attached interiorly at one end 24 to the respective side walls 6 and 8 and at the other end 26 to the respective wings 12 and 14. The side of the unit may be provided with a split-door including a lower half section 28 hinged, as at 30, to the side wall 8 while the corresponding one of the wings 14 may be provided with an upper half section 32 hinged, as at 34, to provide access into the unit. The upper door section 32 may be provided with a suitable window 36 to provide the admission of sunlight into the unit. By such split-door construction, the wings 12 and 14 may be readily erected and collapsed while providing access to the interior of the unit. In some cases, the lower door section 32 being separately hinged may be utilized to gain entrance to the unit in the collapsed position (FIG. 2), either in the stored and/or roading condition of the unit.

A rear wall, designated generally at 38, extends from the floor 10 and includes a lower section 40 hinged, as at 42, to the floor 10; and an upper section 44, hinged, as at 46, to the lower section 40. In the normal collapsed position, the upper section 44 is normally pivoted inwardly into a generally horizontal position, as shown by broken-line in FIG. 15. The rear wall 38 is similarly provided with a spring-loaded tube 48 (FIG. 5) connected at one end 50 to the lower wall section 40 and at the upper end 52 to the upper wall section 44 so as to automatically raise the upper section 44 into the vertically erected position, as shown in FIG. 1. In the normally collapsed position of FIG. 2, the lower wall section 40 is detachably connected to the side walls 6 and 8 by shoulder type suitable bolts 51 which are threaded into the hinged connection 46. In the fully erected position as shown in FIG. 1, the upper wall section 44 may be secured to the transom 55 of the boat by suitable wing type bolts 53. Being hinged as at 42, the rear wall 38 is adapted to pivot outwardly to provide a floor for the collapsible rear porch section A while being hinged, as at 46, the upper wall section 44, upon disconnection of the tube 48 is adapted to pivot inwardly and then outwardly to provide an additional sleeping area E (FIG. 15), as will hereinafter be fully described.

The main body section B is provided adjacent its front end with a pair of quadrant, in side elevation, shaped compartments 54 and 56 which are hinged, as at 58, to the front section 60 of the unit. The compartment 54 provides a storage area for tubing, jacks and other auxiliary equipment, while the compartment 56 provides a housing for the motor M (FIG. 4) and other related components for the fluid actuated control system. By this arrangement either compartment may be raised or lowered (broken-line FIG. 1) independently of the other to provide ready access to the interior thereof. The compartments may be provided with suitable locks (not shown) to prevent unwarranted entry thereto.

To provide additional storage area, a pull-out, drop-down type drawer 62 may be provided to extend through suitable openings provided in the side walls 6 and 8 adjacent the front of the unit. The drawers 62 may be mounted on suitable rollers (not shown) to facilitate movement of the same into the drop-down position adjacent the sides of the unit. Conveniently, the drawers 62 are also easily accessible from the interior of the unit as well as from the exterior thereof.

An undercarrier 64 is hinged to the underside of the main body section B adjacent its front end, as at 66, to provide a storage area for canvas and the like to be employed in erecting the collapsible rear porch section A, and the collapsible undercarriage tent section C. In the normal stored and/or roading condition, the undercarrier 64 is disposed in the horizontal position (FIG. 2) by suitable fastening means, such as rim-type locks not shown. The undercarrier 64 has a width corresponding generally to that of the main body section B and has a length sufficient to provide a roof or awning when pivoted outwardly to provide the front porch section D, as will hereinafter be more fully described.

Figure 6:
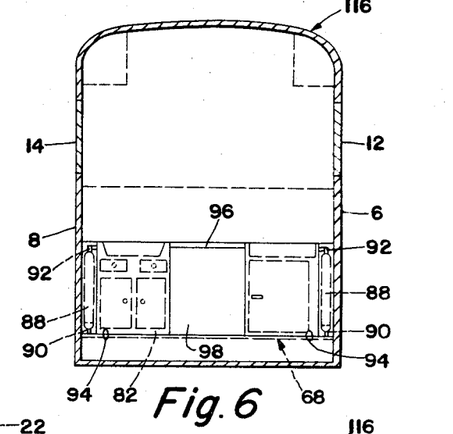
FIG. 6 is a vertical section view taken along the plane of the line 6—6 of FIG. 1.

In accordance with this embodiment of the invention, the main body section B is provided with a novel detachable, interchangeable undercarriage unit. As best shown in FIGS. 1, 2 and 6, the unit, designated generally at 68, is particularly adapted for use with vehicles having a conventional "turtle-back" design at the rear roof and trunk area, as shown at 70 of FIG. 2. In this form, the unit 68 is of a generally polygonal construction having a transverse width corresponding to that of the main body section B, and which is adapted to be detachable connected to the underside of the unit, such as by the use of suitable fasteners such as bolts or the like. The undercarriage unit 68 includes a pair of side walls 72 extending from a bottom 74 and having a generally oblique front wall 76 and being open interiorly at its rear end to provide the construction shown.

The undercarriage unit 68 further includes a novel trunk access section 78. As shown in broken-line of FIG. 1, the access section 78 is of a generally L-shaped construction defined by a top 80 and a front wall 82 disposed generally at right angles to the top 80. The top 80 is preferably hinged, as at 84, to a generally triangular shaped front section 86. By this arrangement, the access section 78 may be pivoted upwardly toward the front end of the unit. To facilitate such pivotal movement, a pair of spring-loaded tubes 88 (FIGS. 1 and 6) are connected at one end 90 to the floor 10 and at the other end 92 to the access section 78. A pair of fastening devices 94 (FIG. 6), such as suit case style latches, are provided adjacent the marginal side edges of the front wall 82 to retain the excess section 78 in the normally closed position. By this arrangement, upon unlatching the fasteners 94, the access section 78 is caused automatically to pivot upwardly toward the front of the unit due to the resilient spring characteristics of the tubes 88, thereby to provide ready ingress and egress to the trunk area of the vehicle. In this connection, it is to be understood that other electromechanical devices may be employed for raising the access section 78 in accordance with the invention.

As best shown in FIG. 6, the front wall 82 of the access section 78 may also conveniently serve to house built-in appliances, such as a sink, kitchen cabinets, portable type stoves, and the like, as customarily applied in outdoor camper units. The top 80 of the access section 78 may be covered with a suitable mattress (not shown) to serve as an additional sleeping area. In addition, it is preferred that the top 80 and front wall 82 be provided with removable panels 96 and 98 to provide ready ingress and egress to the collapsible undercarriage tent section C in the fully erected position of the unit.

Figure 16:
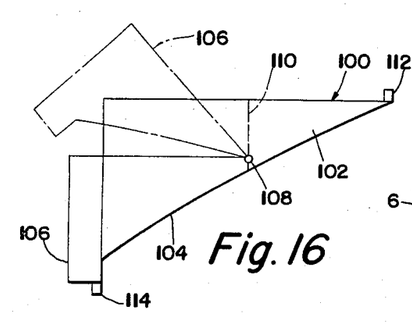
FIG. 16 is a side elevation view showing a modification of the novel detachable, interchangeable undercarriage unit made in accordance with the present invention.

In FIG. 16, there is illustrated a modification of the interchangeable undercarriage unit, designated generally at 100, which is particularly adapted for use with "fastback" designed vehicles. In this form, the unit 100 includes generally triangularly shaped side walls 102 and a generally arcuate shaped bottom 104 which provides a contour corresponding substantially to that of the "fastback" trunk area of the vehicle. This form of the unit similarly includes a pivotal trunk access section 106 hinged, as at 108, to a triangular shaped section 110. In this form, however, the access section 106 is also generally triangular shaped, in side elevation, so as to correspond to the contour of the "fastback" type vehicle. A pair of apertured flanges 112 and 114 extend along the top front and lower rear marginal edges of the unit so that the latter may be detachably connected by suitable bolts or the like to the underside of the main body section B, as aforesaid.

The interchangeable undercarriage units 68 and 100 illustrated provide a quick and easy attachment to the unit so as to provide great versatility in using the unit with most all vehicle designs. In addition, it can be seen that the incorporation of the pivotal trunk sections 68 and 106 provide ready access to the trunk area of the vehicle in the normal roading position, shown in FIG. 2; and provide ready access to the collapsible undercarriage tent section C, as shown in FIG. 1, to provide split-level living accommodations. Furthermore, it can be seen that the interchangeable undercarriage units provide additional interior living area in the height between the vehicle trunk and the underside of the main body section B.

A water craft, designated generally at 116, of novel construction provides an integral, yet detachable closure in the form of a roof in the collapsed position (FIG. 2), or the erected position (FIG. 1) of the unit. The craft 116 is also hinged at its bow, as at 58, to the under and is latched as at 118, adjacent its gunwhales to the side walls 6 and 8 of the unit. The marginal top edges 120 (FIG. 2) of the respective side walls 6 and 8 are preferably longitudinally curved from front to rear so as to correspond to the general contour of the craft for supporting the same in the roading condition of the unit. By this arrangement, the unit provides a streamlined, low profile construction which offers a minimum wind resistance and which enables the unit to travel at relatively high speed beneath low hanging obstructions.

Similarly, both the upper 122 and lower 124 marginal edges (FIG. 1) of the wings 12 and 14 are preferably curved longitudinally from front to rear to correspond to the contour of the craft as shown in FIG. 1. As shown in FIGS. 7–9, it will also be noted that the confronting lower marginal edges 124 of the respective wings 12 and 14 and the confronting upper marginal edges 120 of the respective side walls 6 and 8 are curved transversely from the inside to the outside of the unit to facilitate pivotal movement of the wings relative to the side walls. In addition, such arrangement prevents the seepage of moisture into the unit. The radius of curvature R adjacent the ends of the side walls 6 and 8 and the wings 12 and 14 (FIGS. 7 and 9) is substantially less than the radius of curvature R' adjacent the middle of the unit (FIG. 8) so as to prevent "binding" of the wings upon pivotal movement relative to the side walls during erection of the unit.

Figure 4:
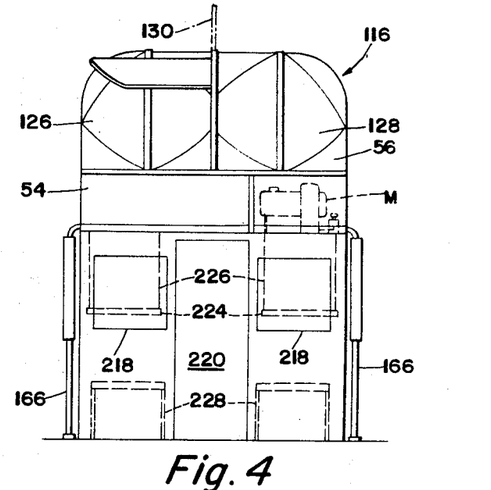
FIG. 4 is a front end view of the unit looking from the righthand side of FIG. 1.
Figure 5:
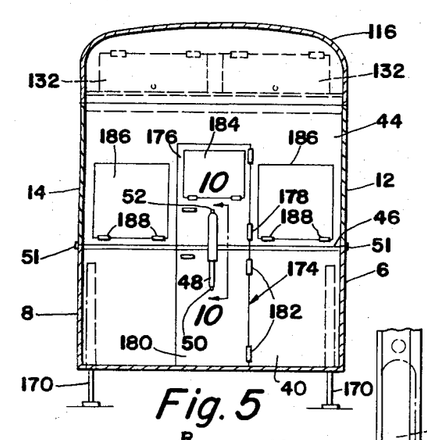
FIG. 5 is a vertical section view taken along the plane of line 5—5 of FIG. 1.

The water craft 116 as best shown in FIGS. 1, 2 and 4, is readily adapted either as a motor or sail craft including a novel twin hull construction 126 and 128 having a relatively wide width corresponding to the width of the main body section B which provides a maximum stability and a minimum draft for boating purposes. The craft 116 is provided with a center keel board 130 which is pivotally attached to the twin hull so as to be readily folded to one side during normal roading condition of the unit, as shown in FIG. 4. Moreover, in the mounted position of the craft 116 on the unit, the craft provides an integral roof or closure that gives additional head room in the interior of the unit. Furthermore, it will be noted that the storage compartments 132 provided in the craft is readily accessible from the inside of the unit, as shown in FIG. 5.

Figure 3:
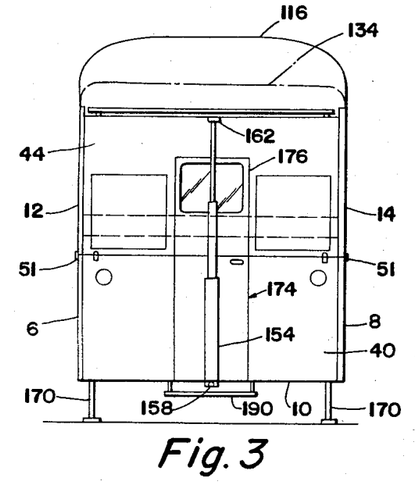
FIG. 3 is a rear end view of the unit looking from the lefthand side of FIG. 1 with the collapsible rear porch section removed from the unit for purposes of clarity.

In instances where the water craft 116 is moved from the unit, and auxiliary top 134, such as comprised of canvas or the like, may be provided, as shown by broken line in FIG. 3. In such case, arched tubing supports (not shown) may be attached to the side walls 6 and 8 to support the auxiliary top in the completely collapsed position, as shown in FIG. 2. In other cases, arched tubing supports may be attached to the wings 12 and 14 in the fully erected position, as shown in FIG. 1. By such arrangement, the water craft 116 provides the dual function of an integral roof closure for the unit while at the same time providing a convenient boat for sailing purposes. In this connection, when the auxiliary canvas top 134 is not in use, it may be conveniently stored in the front section of the unit above the drop-down drawers 62.

Figure 15:
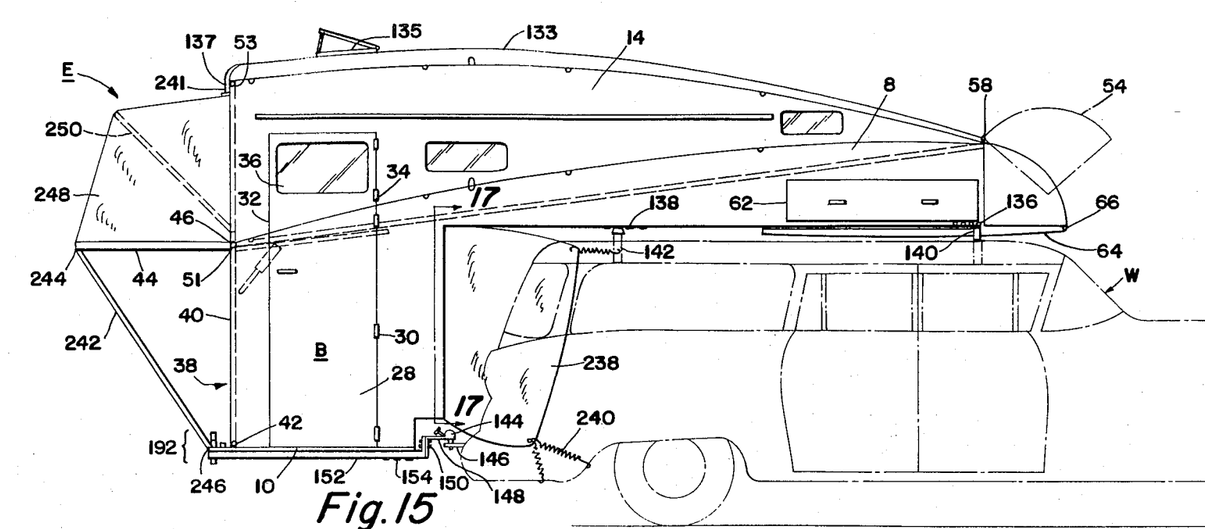
FIG. 15 is a side elevation view showing a modification of the camper unit made in accordance with the present invention in a partially erected position and mounted on a vehicle for camping and/or travel.

As an alternative, a regular top 133 may be provided in cases where the water craft 116 or canvas top 134 are not used, as shown in FIG. 15. The regular top 133 may be comprised of any suitable material, such as metal, wood or the like, which is also hinged, as at 58, to the bow adjacent the front of the body section B. The regular top 133 is also preferably curved longitudinally so as to correspond to the curved confronting marginal edges of the wings 12 and 14 and the upper rear wall section 44, as aforesaid. In this form, the top 133 is preferably provided with a hinged door 135 to provide ventilation to the interior of the unit and has an integral lip 137 adjacent the stern which overhangs the confronting upper marginal edge of the upper rear wall section 44.

To mount the main body section B on the vehicle 4, a plurality of spaced lugs are provided adjacent the front 136 and middle 138 areas of the section which lugs are adapted to receive vertically adjustable carrier members 140 and 142, respectively. The spaced lugs 136, 138 provide ready horizontal adjustment so that the unit can be mounted on practically any type of vehicle. A ball and socket type hitch 144 is provided to attach the unit to the rear bumper 146 of the vehicle 4. As best shown in FIG. 15, the hitch 144 includes a generaly L-shaped 148 bracket attached for vertical adjustment by means of bolts 150 to another bracket 152 which is attached for horizontal adjustment by bolts 154 to the underside of the floor 10. By this arrangement, the unit may be readily attached to vehicles having a wide variety of sizes and styles of bumper designs.

The main body section B may be quickly and easily erected simply by actuating a three-stage, fluid operated telescopic jack 156 which is hinged by lugs, as at 158, to the floor 10 of the unit and to the rear of the craft by hinged lugs, as at 162. Actuation of the jack 156 pivots the craft 116 upwardly about its hinged connection 58 at the front of the unit until its stern is raised, as shown in FIG. 1. A lock, such as of the hook and eye type (not shown) may then be unlatched so that the normally horizontally disposposed wings 12 and 14 are caused to automatically spring upwardly one at a time due to the influence of the spring-loaded tubes 22 until they are raised into the vertically erected position. With the wings 12 and 14 erected, the normally horizontally disposed upper rear wall section 44 is automatically pivoted upwardly into the vertical erected position about its hinged connection 46 to the lower section 40 under the influence of the spring-loaded tube 48. With the wings 12 and 14 and the upper rear wall section 44 erected, the jack 156 may then be actuated to lower the craft 116 into closed supported engagement upon the upper marginal edges of the wings 12 and 14, and upon the upper marginal edge of the rear wall section 44, as shown in FIG. 1. The jack 156 may then be removed from the rear of the unit and stored within one of the forward compartments 54, as desired.

Thus erected, three pairs of fluid actuated telescopic jacks 166, 168 and 170 may then be actuated from a control source in one of the forward compartments. The first pair of jacks 166 are ordinarily stored in the compartment 54 at the front of the unit and are readily connected at one end by any suitable type connection, such as by threading, to the respective spaced lugs 136 provided on the main body section B, as aforesaid. The other two pairs of jacks 168 and 170 are preferably disposed within the side walls 6 and 8 of the main body section B and are ordinarily stored in the raised position (FIG. 2) during normal roading of the unit. The jacks 168 are preferably provided with a pair of inflatable type wheels 172 so that upon lowering of the same, the unit can be readily moved from one area to another even after the vehicle is removed from beneath the unit. Thus, it will be seen that with the main body section B completely erected and with the jack 156, 168 and 170 lowered for supporting the unit above the ground, the vehicle 4 may be drawn from beneath the unit for use in other purposes.

To provide ingress and egress from the collapsible rear porch section A to the interior of the unit, the rear wall 38 (FIGS. 3 and 5) of the main body section B may be provided with a split-door, designated generally at 174. The door 174 includes an upper section 176 hinged on the inside, as at 178, to the upper wall section 44; and a lower door section 180 hinged on the inside, as at 182, to the lower wall section 40. In this case, either door section may be employed independently of the other as in the case of the side door. The upper door section 176 may be conveniently provided with a window 184 to admit sunlight to the unit. Furthermore, an additional two rear windows with window covers 186 when this wall is used for a floor may be hinged on the inside, as at 188, on either side of the upper door section 176. A suitable step 190 (FIG. 3) may be provided to facilitate entrance into the rear of the unit.

The collapsible rear porch section A may be erected simply by removing three support channels, designated generally at 192 from the rear of the unit, as shown in FIG. 2 and FIG. 15. The channels 192 are connected at one end to the unit and supported at the other end upon screw type jacks 194. Thus assembled, the rear wall 38, may be pivoted about its hinged connection 42 and supported upon the channels 192 so as to provide a floor for the porch section A. A pair of manually operable telescopic poles 196 may then be installed in suitable apertures provided in the corners of the floor providing wall 38, as at 197. A telescopic Y-pole of novel construction, designated generally at 198, may then be attached to the ends of the poles 196 and at its other end to the hinged lug 162 which was formerly employed for attachment to the three-stage telescopic jack 156. The frame work thus assembled may then be covered with a suitable canvas 200 which is normally stored in the undercarrier 64. The canvas 200 may be provided with suitable snaps (not shown) for securement to the side walls 6 and 8 and floor defining wall 38 of the porch section, A. Thus secured, the telescopic Y-pole 198 may then be manually actuated to draw the canvas tight around the framework. The porch section A may be provided with conventional zip-type windows 202 and door (not shown) in the rear wall, as desired. In use of the porch section A, the door 174 and windows 186 in the rear wall 38 may be covered with suitable panels or the like so to prevent opening thereof. Thus erected, the rear porch section A provides a convenient living and/or sleeping area into which may be placed suitable fold-up beds 204 or the like.

The collapsible undercarriage tent section C and front porch section D may be erected simply by unlatching and pivoting the undercarrier 64 into the horizontal position shown in FIG. 1. The undercarrier 64 may then be supported adjacent its ends by a pair of manually operable telescopic poles 206 which may be additionally secured by tie-down lines 208 attached to the ground. A canvas closure 210 stored in the undercarrier 64 may then be secured, such as by suitable snaps or the like, to the undercarrier, as at 212, and to the main body section B, as at 214, to provide a completely enclosed tent section.

The collapsible undercarriage tent section C may be provided with zip-type side 216 and front 218 (FIG. 4) windows as well as with a zip-type front door 220, as shown in FIG. 4. Conveniently, the section may also be provided with a detachable floor covering 222 comprised of a polymeric plastic material, such as vinyl or the like. To provide additional sleeping accommodations, a pair of drop-type beds 224 may be suspended from the underside of the main body section B by means of suitable chains 226. Fold-up type beds 228 may also be utilized to increase the sleeping accommodations, as desired. By this arrangement, the section provides a unique split-level living and/or sleeping area which is conveniently accessible from the interior of the unit by means of the access trunk section 78 or from the exterior through the door 220 as desired.

Figure 17:
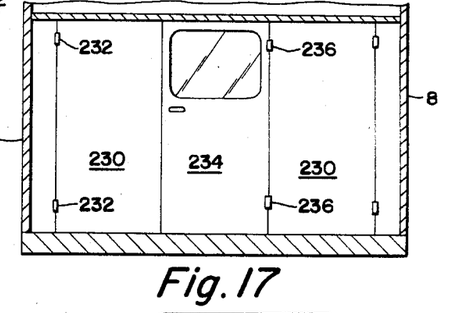
FIG. 17 is an enlarged vertical section view taken along the plane of line 17—17 of FIG. 15.

In FIGS. 15 and 17, there is illustrated a modification of the camper unit which is generally identical to that shown in FIGS. 1–6, except that in this form the unit is particularly adapted for use with vehicles of the station wagon type W. The unit similarly incorporates the aforementioned collapsible rear porch section A, the partially collapsible main body section B, the collapsible undercarriage tent section C, and the front porch section D, as aforesaid. In this form, however, the unit does not incorporate the detachable, interchangeable undercarriage units 68 and 100 due to the absence of the trunk area in such wagon type vehicles. Moreover, in this embodiment, to provide access to the vehicle W, or to the collapsible undercarriage tent section C, a novel access door construction is provided which includes two side panels 230 (FIG. 17) hinged to the side walls 6 and 8, as at 232, and a center door 234 hinged to one of the panels, as at 236. The two panels 230 and door 234 may be provided with suitable fasteners, such as rim type locks not shown, to retain the same in closed position. By this arrangement, the panels and/or door may be swung open to provide entry into the rear of the vehicle W. In such case, the tailgate and/or rear doors of the vehicle, as the case may be, may be opened and dropped into the unit to provide a convenient bridge therebetween.

When the panels 230 and/or door 234 are opened for entry into the vehicle W, a detachable canvas boot 238 may be employed to provide a weather tight juncture therebetween. In such case, the booth 238 is secured to the main body section B, such as by suitable snaps (not shown) and to the vehicle W by suitable resilient hooks 240 so as to maintain tension on the boot 238 in the assembled position.

In this embodiment, a rear bed section E is provided to make available an additional sleeping area within the unit. The bed section E is similarly incorporated in the unit illustrated in FIGS. 1–6. This bed section E is erected simply by detaching the spring tube 48 from the rear wall 38 and by removing the bolts 51 from the lower wall section 40, whereupon, the upper wall section 44 may be pivoted inwardly while the lower section 40 may be simultaneously pivoted outwardly so that the upper wall section 44 is enabled to clear the overhanging lip 137 of the regular top 133. Thus cleared, the lower wall section 40 may then be returned to its vertical position and again secured by the bolts 51, whereupon, the upper wall section 44 may then be pivoted outwardly into the horizontal position, as shown in FIG. 15. A pair of support rods 242 may then be attached at one end to the free end of the upper wall section 44, as at 244, and at the other end within apertures provided in the bumper channels, as at 246. A canvas closure 248 may then be secured, such as by suitable snaps not shown, around the framework thus provided. A pair of angularly disposed support tubes 250 may be attached to the side walls 6 and 8 and adapted to bear at the other end against the canvas closure 248 to maintain tension thereon.

Figure 10:
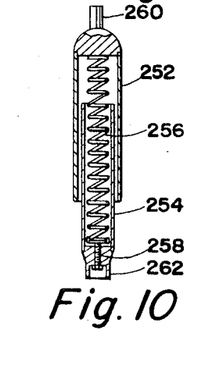
FIG. 10 is an enlarged section view of one of the spring-loaded tubes made in accordance with the present invention.

As best shown in FIG. 10, the spring tubes 22, 48 and 88 employed in the invention comprise an outer cylindrical tube 252 and an inner cylindrical tube 254 disposed for axial telescopic movement within the outer tube 252. A resilient compression spring 256 is connected at one end to the inner tube 254 by means of an adjustable bolt 258 and bears at its other end against the outer tube 252. By this arrangement, the resilient characteristics of the spring 256 can be readily adjusted to compensate for various weight requirements in use of the unit. The ends of the respective tubes 252 and 254 may be provided with suitable lugs 260 and 262 to facilitate attachment to the unit.

Figures 11, 12, 13:
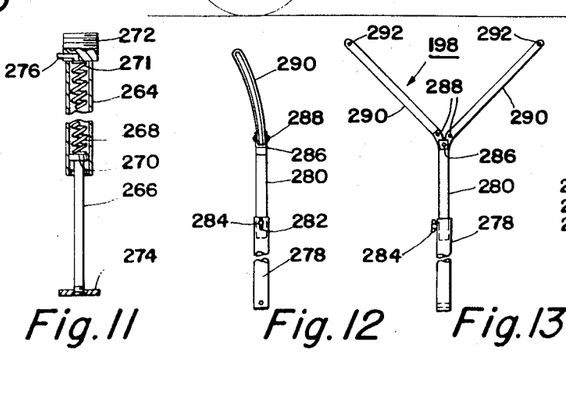
FIG. 11 is an enlarged section view of one of the fluid actuated telescopic jacks made in accordance with the present invention.
FIG. 12 is an enlarged side elevation view of the novel Y-pole construction made in accordance with the present invention.
FIG. 13 is an enlarged front elevation view of the Y-pole construction shown in FIG. 12.

As shown in FIG. 11, the fluid actuated jacks 166, 168 and 170 employed in the invention comprise a closed cylinder 264 and an elongated piston, support rod 266 which is disposed for reciprocal movement within the cylinder 264. A compression spring 268 is disposed within the cylinder 264 and bears at one end against a flange 270 provided on the rod 266 and at its other end against the closed end 271 of the cylinder. One end of the cylinder 264 is threaded, as at 272, for connection to the aforementioned lugs 136 and 138 provided on the main body section B of the unit, while the end of the rod 266 is threaded into a plate 274 for engagement with the ground. A fluid inlet passageway 276 is provided adjacent the end of the cylinder 264 to admit fluid under pressure for moving the rod 266 into the extended downward position. Conversely, upon release of fluid pressure from within the cylinder, the rod 266 is drawn upwardly due to the resilient characteristics of the spring 268.

Figure 14:
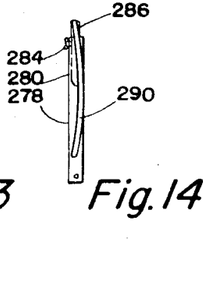
FIG. 14 is an enlarged side elevation view and showing the Y-pole of FIGS. 12 and 13 in the folded position.

The novel telescopic Y-pole 198 which facilitates support of the rear porch section A, as best shown in FIGS. 12–14, comprises an elongated, cylindrical outer tube 278 and a cylindrical inner tube 280 disposed for telescopic movement within the outer tube 278. The outer tube 278 may be slotted at one end, as at 282, to receive a pin 284 projecting from the inner tube 280. By this arrangement, there is provided a bayonet-type connection to retain the tubes in the telescopic locked position. One end of the inner tube 278 may be provided with a Y-coupling 286 to which is pivotally attached, as at 288, to a pair of bowed or arcuate, in side elevation, shaped tubes 290. The ends of the tubes 290 are provided with suitable apertures 292 for attachment to the manually operable telescopic poles 196, as aforesaid. The bowed or arcuate contour of the tubes 290 provide a corresponding contour in the roof of the rear porch section A so as to maintain a maximum tension in the canvas material 200 and to facilitate the drainage of moisture therefrom. Accordingly, due to the novel pivotal connection of the tubes 290, the Y-pole may be conveniently folded into a compact unit, as shown in FIG. 14, and stored within a limited area.

Figure 18:
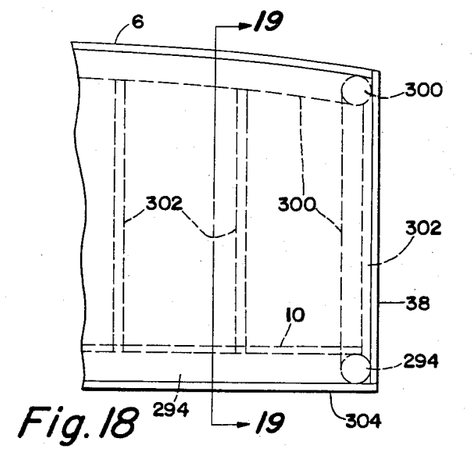
FIG. 18 is an enlarged fragmentary front elevation view looking in the direction of line 18—18 of FIG. 24.
Figure 19:
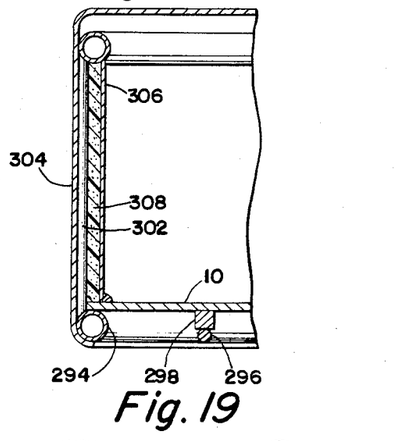
FIG. 19 is a fragmentary vertical section taken along the plane of line 19—19 of FIG. 18.

The side wall 6, 8, rear wall 38 and floor 10 construction of the unit is illustrated generally at FIGS. 18 and 19. As shown, the floor 10 is mounted on a frame comprised of a plurality of integrally connected larger diameter tubes 294 between which extend spaced, longitudinally extending smaller diameter tubes 296. Wooden support members 298 are mounted in direct contact with the smaller tubes 296 and provide a direct support for the floor 10.

The side 6, 8 and rear walls 38 are provided by similar larger diameter tubes 300 integrally connected to the aforementioned larger diameter tubes 294. A plurality of similar smaller diameter tubes 302 are integrally connected to and extend vertically between the larger diameter tubes 294 and 300 to provide a suitable framework for the walls.

The side wall framework is preferably covered with a thin outer skin 304 comprised of a metallic material, such as aluminum or the like, and a thin inner skin 306 comprised of a polymeric plastic material. The thin inner skin 306 may be provided with a suitable surface automentation to enhance the decorative appearance of the interior of the unit.

In accordance with the invention, it is preferred that a light weight insulating material 308 be disposed in the area between the outer 304 and inner skins 306. It is preferred that the material be a foam, such as polyurethane foam or the like. The foam material 308 is preferably pre-fabricated in one piece so as to provide the entire side wall and/or rear wall of the unit. The foam material 308 may also be specially molded so as to accommodate the tubing which comprise the framework for the wall structure. In some instances, the foam 308 may be poured directly between the inner and outer skins and cured to provide composite wall structure. In either case, the foam 308 is merely rested by its own weight in direct contact with the larger diameter tubes 294 which provides the framework for the floor 10. This laminate-like construction substantially reduces the overall weight of the unit, yet provides the necessary self-support and strength characteristics for maximum serviceability.

Figure 20:
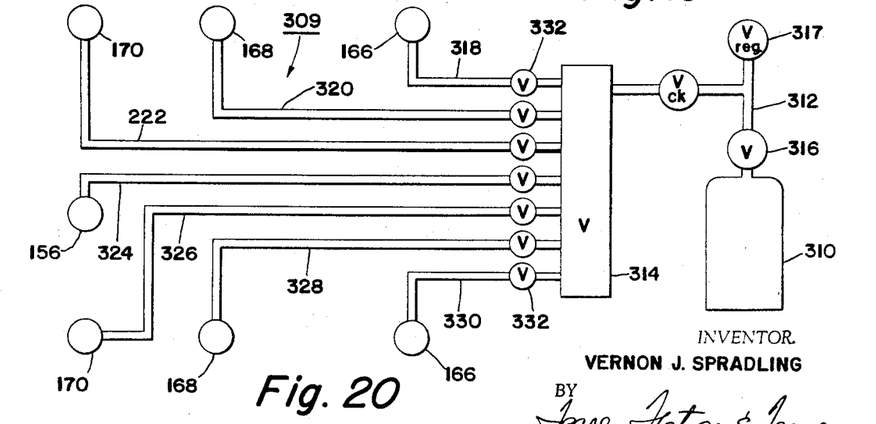
FIG. 20 is a schematic illustration showing the fluid pressure control system for actuating the telescopic jacks of the present invention.

In FIG. 20, there is diagrammatically illustrated a schematic fluid control system, designated generally at 309, for operation of the aforementioned pairs of telescopic jacks 166, 168, 170 and the three-stage telescopic jack 156. As shown the system includes a supply tank 310 which provides the source of fluid pressure. A supply line 312 extends from the tank 310 to a fluid distribution block 314. A regulator valve 316 may be provided on the tank 310 to control fluid pressure admitted through the distribution block 314, while a fluid inlet valve 317 may be provided in the line 312 for replenishing the source of fluid pressure in the tank 310.

Extending from the distribution block 314 are a series of seven distribution lines 318–330 which transmit fluid pressure from the tank 310 via the block 314 to the respective jacks 156, 166, 168 and 170. Regulator valves 332 may be provided in the respective supply lines 318–330 adjacent the distribution block 314 so as to provide independent and selective operation of each of the respective jacks, as desired. The supply lines 318–330 may be grouped together in any desired arrangement and installed within the side walls 6 and 8 immediately below the associated jack to which they are to be applied.

The invention may be embodied in other specific forms without departing from the spirit or essential characteristics thereof. The present embodiments therefore, are to be considered in all respects as illustrative and not restrictive, the scope of the invention being set forth in appended claims rather than by the foregoing description, and all changes which come within the meaning and range of equivalency of the claims are therefore intended to be embraced therein.

I claim:

1. A camper unit adapted to be detachably mounted on a vehicle of the type including a passenger compartment and a trunk area, said unit comprising a partially collapsible body section mounted over the compartment, trunk area and extending downwardly and rearwardly adjacent the trunk area of said vehicle, said body section including a floor, front, rear and side walls, a wing hinged to each of said side walls, said wings being pivotable from a generally horizontal collapsed position to a generally vertical erected position, a cover means adapted to be superimposed over said body section, an interchangeable undercarriage means detachably connected to the underside of said body section adjacent the trunk area of said vehicle, and access means hinged to said undercarriage means adapted to pivot from a closed position to a raised position to provide ingress and egress to said trunk area.

2. A camper unit in accordance with claim 1, including resilient spring actuated means attached to said body section and to said access means for automatically pivoting the latter into said raised position.

3. A camper unit in accordance with claim 1, wherein said access means includes at least one removable member to provide ingress and egress to the exterior of said body section in the closed position of said access means.

4. A camper unit in accordance with claim 1, including an undercarrier means hinged to the underside of said body section adjacent the compartment of said vehicle, said undercarrier means being adapted to be pivoted outwardly from beneath said body section and forwardly into a generally horizontal raised position, and support means for retaining the undercarrier means in said raised position.

5. A camper unit in accordance with claim 1, including resilient spring actuated means operably connected to each of said sidewalls and to each of said wings for automatically pivoting the latter from the horizontal closed position to the vertical erected position.

6. A camper unit in accordance with claim 1, wherein said rear wall includes a lower section hinged to said floor and an upper section hinged to said lower section, said upper section being adapted to be pivoted from a generally horizontal closed position to a generally vertical erected position, and spring actuated means operably connected to said lower section and to said upper section for automatically pivoting the latter into said vertical erected position.

7. A camper unit in accordance with claim 6, including a support means extending angularly upwardly from said body section, said upper rear wall section being adapted to be pivoted from said vertical erected position outwardly into a generally horizontal position into engagement with said support means, and a fabric material adapted to be supported over said upper rear wall section to provide a collapsible bed section adjacent the rear of the unit.

8. A camper unit in accordance with claim 1, including a plurality of telescopic fluid pressure actuated means operably connected to said body section for supporting the latter above the ground upon removal of said vehicle, a source of fluid pressure, and control means for selectively and independently transmitting fluid under pressure from said source to said telescopic means.

9. A camper unit in accordance with claim 8, wherein certain of said telescopic means are provided adjacent their ends with wheels adapted for engagement with the ground to transport the unit from one area to another by means of or independent of said vehicle.

10. A camper unit in accordance with claim 6, wherein one of said side walls includes a lower half hinged door section and wherein the associated wing includes a corresponding upper half hinged door section to provide ingress and egress in the collapsed or erected position of the unit, the lower rear wall section including a lower half hinged door section and the upper rear door section including a corresponding upper half hinged door section to provide ingress and egress in the collapsed or erected position of the unit.

11. A camper unit adapted to be detachably mounted on a vehicle of the type including a passenger compartment and a trunk area, said unit comprising a partially collapsible body section adapted to be mounted over the passenger compartment and trunk area of said vehicle, said body section including a floor, rigid front and side walls, a rear wall having a lower section hinged adjacent said floor and an upper section hinged to said lower section, said upper section being adapted to be pivoted from a generally horizontal collapsed position to a generally vertical erected position, a wing hinged to each of said side walls, said wings being adapted to be pivoted from a generally horizontal collapsed position to a generally vertical erected position, and a detachable closure means adapted to be superimposed over said wings and said upper wall section in the erected position thereof, resilient spring actuated means operably connected to said wings and to said upper rear wall section for automatically pivoting the same into said vertical erected position, wherein said closure means includes a water craft superimposed in inverted relationship on the upper marginal edges of said wings and said upper rear wall section in the erected position thereof, said craft being hinged adjacent its bow to the front of said body section, and detachably connected adjacent its stern to the rear of said body section.

12. A camper unit in accordance with claim 11, including a telescopic fluid actuated means detachably mounted adjacent the rear of said body section adapted to be operably connected adjacent the stern of said craft for pivoting the latter upwardly into a raised position to facilitate erecting or collapsing of said wings and upper rear wall section.

13. A camper unit in accordance with claim 11, wherein the closure means includes a top means independent of said craft, and means for supporting the top upon removal of said craft from said body section.

14. A camper unit in accordance with claim 11, including an undercarrier hinged to the underside of said body section adjacent the passenger compartment of said vehicle, said undercarrier being adapted to pivot outwardly from beneath said body section and forwardly into a generally horizontal raised position, support means for retaining the undercarrier in the raised position, and a fabric material normally stored in said undercarrier adapted to be secured to the undercarrier and to the body section to provide a collapsible undercarriage tent section upon removal of the vehicle.

15. A camper unit in accordance with claim 14, wherein said body section includes an excess means, said excess means including a pair of spaced panels hinged to said side walls and a door disposed intermediate said panels and hinged to one of said panels to provide ingress and egress to the trunk area of said vehicle or to said collapsible undercarriage tent section upon removal of the vehicle.

References Cited

UNITED STATES PATENTS

| | | | |
|---|---|---|---|
| 2,718,015 | 9/1955 | Fisk | 296—23 |
| 3,002,760 | 10/1961 | Lee | 280—43.23 |
| 3,061,359 | 10/1962 | Pearlman | 296—26 |
| 3,143,121 | 8/1964 | McKee | 135—1 |
| 3,185,518 | 5/1965 | Zentner | 296—23 |

PHILIP GOODMAN, *Primary Examiner.*